US006830273B2

(12) United States Patent
Michler et al.

(10) Patent No.: US 6,830,273 B2
(45) Date of Patent: Dec. 14, 2004

(54) PARALLEL GRIPPER

(75) Inventors: Gerhard Michler, Ilsfeld (DE); Ralf Winkler, Nordheim (DE)

(73) Assignee: Schunk GmbH & Co. KG Fabrik fur Spann - und Greifwerkzeuge, Lauffen am Neckar (DE)

(*) Notice: Subject to any disclaimer, the term of this patent is extended or adjusted under 35 U.S.C. 154(b) by 44 days.

(21) Appl. No.: 10/221,606

(22) PCT Filed: Mar. 2, 2001

(86) PCT No.: PCT/EP01/02384

§ 371 (c)(1),
(2), (4) Date: Sep. 13, 2002

(87) PCT Pub. No.: WO01/68328

PCT Pub. Date: Sep. 20, 2001

(65) Prior Publication Data

US 2003/0030294 A1 Feb. 13, 2003

(30) Foreign Application Priority Data

Mar. 15, 2000 (DE) ................................. 200 04 757 U
Mar. 17, 2000 (DE) .................................... 100 13 022

(51) Int. Cl.[7] .............................................. B25J 15/08
(52) U.S. Cl. ................... 294/88; 294/119.1; 269/32; 269/34; 269/234; 279/121
(58) Field of Search .............................. 294/88, 119.1, 294/116; 901/37; 269/32, 34, 234; 279/4.12, 17, 110, 121, 123

(56) References Cited

U.S. PATENT DOCUMENTS

| 4,593,948 | A | * | 6/1986 | Borcea et al. | 294/88 |
|---|---|---|---|---|---|
| 4,874,194 | A | * | 10/1989 | Borcea et al. | 294/119.1 |
| 4,913,481 | A | * | 4/1990 | Chin et al. | 294/119.1 |
| 5,090,757 | A | * | 2/1992 | Huber et al. | 294/119.1 |
| 5,125,708 | A | * | 6/1992 | Borcea et al. | 294/119.1 |
| 5,529,359 | A | * | 6/1996 | Borcea et al. | 294/88 |
| 5,762,391 | A | * | 6/1998 | Sumnitsch | 294/119.1 |
| 5,842,703 | A | * | 12/1998 | Antoni | 279/121 |
| 5,890,720 | A | * | 4/1999 | Antoni | 279/121 |
| 5,947,539 | A | * | 9/1999 | Long et al. | 294/119.1 |
| 5,967,581 | A | | 10/1999 | Bertini | 294/119.1 |
| 6,086,125 | A | * | 7/2000 | Kovacs et al. | 294/88 |
| 6,394,521 | B1 | * | 5/2002 | Bertini | 294/88 |
| 6,502,880 | B1 | * | 1/2003 | Sawdon | 294/88 |

FOREIGN PATENT DOCUMENTS

| DE | 800201 | * 10/1950 |
|---|---|---|
| DE | 197 41 983 | 9/1997 |
| DE | 197 04 444 | 5/1998 |
| EP | 0 790 106 | 1/1997 |
| EP | 0 313 947 | 5/1998 |
| GB | 2 229 990 | 10/1990 |

* cited by examiner

Primary Examiner—Paul T. Chin
(74) Attorney, Agent, or Firm—Young & Basile, PC

(57) ABSTRACT

A parallel gripper includes a housing and two adjustable gripper base jaws which are displacably guided in a jaw guiding recess. The base jaws are moved relative to one another by a wedge hook gearing that is adjusted by a piston guided in the housing. The jaw guiding recess is provided with complementary configured guiding grooves. The ratio of the wall thickness of the housing between the base of the guiding grooves and the outside of the housing to the width of the housing measured vertically in relation to the direction of displacement of the base jaws is at least 0.2. The ratio of the width of inclined traction of the wedge hook gearing to the outside width of the base jaws is at least 0.4.

8 Claims, 2 Drawing Sheets

PARALLEL GRIPPER

BACKGROUND

The invention relates to a parallel gripper having a housing and two adjustable base jaws which are slidably guided in the housing in a jaw guide opening, where the base jaws can be moved toward or away from each other by means of a wedge hook mechanism, and the wedge hook mechanism is adjustable by means of a piston which is guided in the housing.

Such parallel grippers are known. The two base jaws, on which extensions can be installed as gripper fingers, are often configured in known embodiments as a T-shape, when viewed in cross section and in the sliding direction, where the crossbar of the T-shape facing away from the workpiece is slidably, guided in a correspondingly configured jaw guide opening in the housing. There are also embodiments using rollers. In order to be able to generate high clamping forces and compensate for the concomitant rotational forces, the jaw guide has to be given a correspondingly large width, which means that the outside dimension of the base jaw, meaning the width in the direction of the transverse bar of the T-shape, must be made extremely large, compared with the width of the actual base body of the jaw. However, the result is that the width of the wedge hook connection, which is also described as the angular power transmission width and which is necessarily less than the width of the base body of the jaws, is likewise very small. This, in turn, mitigates against the transmission of high clamping forces.

Furthermore, every effort is made in the case of parallel grippers to keep the housing width as small as possible in order to reduce the required installation space. When the wall thickness of the housing is reduced, however, undesirable twisting and distortion occurs in the housing, undesirable with respect to the precision to be achieved, particularly when clamping forces are introduced and transmitted.

With this as the point of departure, the object of the present invention is to improve a parallel gripper of the type descried above so that, on the one hand, high clamping forces can be transmitted and absorbed, but the smallest possible overall installation space is utilized and, nonetheless, a high degree of precision is ensured during automation when using this parallel gripper.

SUMMARY

In accordance with the invention, this object is accomplished with a parallel gripper in which the piston has an oval or substantially rectangularly configured shape with rounded corners and each base jaw has on both sides at least two guide ribs which are rectangular, wedge-shaped or trapezoidal extending in the direction of motion and the jaw guide opening has guide groove configured complementary thereto and the ratio of the housing wall thickness —measured between the root of the guide grooves and the outside of the housing —to the width of the housing —measured perpendicular to the direction of motion of the base jaws —is at least 0.2 and the ratio of the angular power transmission width of the wedge hook mechanism (width of the wedge hook) to the outside width of the base jaw is, at least 0.4

Through the combination of the preceding features, optimal utilization of the normally rectangular geometry of parallel gripper housings is achieved by the use of an oval or essentially rectangular piston in a generic parallel gripper. A greatest possible actuating force can be attained by utilizing the largest possible piston surface available. The piston is preferably operable hydraulically or pneumatically.

As a result of the base jaws each having at least two wedge-shaped or trapezoid-shaped guide ribs on both sides, the guide width achieved by these guide ribs in conjunction with the guide grooves can be increased in accordance with the number of guide ribs. So it is possible to realize a very small external width for the base jaw compared with bulkily configured broad T-guide grooves, or, expressed differently, the external width of the base jaw (measured from guide rib to guide rib) is only a very small amount larger than the width of the body of the base jaw or, expressed differently again, the width of the body of the base jaw is very large, compared with the external width of the base jaw, which in turn means that the angular power transmission width of the wedge hook connection, compared with the overall external width of the gripper base jaw, can be made very large. The great force from the oval or essentially rectangular piston can hereby be transferred to the gripper base jaws. The ratio of the width of the wedge hook to the external width of the base jaw is at least 0.4, preferably 0.5–0.7, and specifically 0.5–0.6.

As a further result of the ratio of the wall thickness of the housing to the total housing width being at least 0.2, preferably 0.23–0.3, and specifically 0.23–0.27, a stable design for the gripper housing is achieved, which can also sustain high rotational forces without distortion when gripping forces are transmitted and introduced.

Swiss patent 800 201 shows the use of several wedge-shaped guide ribs with jaw guides for centric chucks. The use of wedge hook mechanisms on parallel grippers is widely known. A proposal has also already been made to use oval actuating pistons in gripping devices.

With the present invention, a parallel gripper has been created which is compact overall, extremely stable and suitable for the transmission and absorption of high gripping forces and rotational moments.

In a preferred embodiment of the parallel gripper, the wedge hook mechanism has a wedge hook which is adjustable by means of the piston, the wedge hook engaging recesses running obliquely on both sides in the two base jaws.

The coupling between the piston and the wedge hook mechanism can be configured in any way. It has proved to be particularly advantageous if the wedge hook extends with a rod section through an opening in the housing in the bottom of the jaw guide opening into a cylinder, which is preferably formed by the housing body itself, and is connected there to the piston drive.

It also proves to be advantageous if the guide ribs are extended over the corresponding full length of each base jaw, not only to achieve the greatest possible guide width but also to achieve a great guide length, which specifically supports the absorption of rotational moments.

Furthermore, it is proposed that the ratio of the height of the guide ribs, which is measured as the amount the guide ribs protrude beyond the lateral surface of the body of the base jaws, to the width of the body of the base jaws (base width) be between 0.15 and 0.25, preferably between 0.19 and 0.24. To this extent, it is particularly recommended to provide three guide ribs located parallel one above the other, preferably over the entire length of the base jaw.

The angle of the flanks of the guide ribs is advantageously between 12° and 20°, preferably between 14° and 17° to the normal direction of the guide ribs onto the lateral surface of the body of the base jaws.

BRIEF DESCRIPTION OF THE DRAWING

Additional features, details and advantages of the invention can be found in the claims and the attached drawings and the subsequent description of a preferred aspect of the inventions. In the drawing:

DETAILED DESCRIPTION

Figure 1:
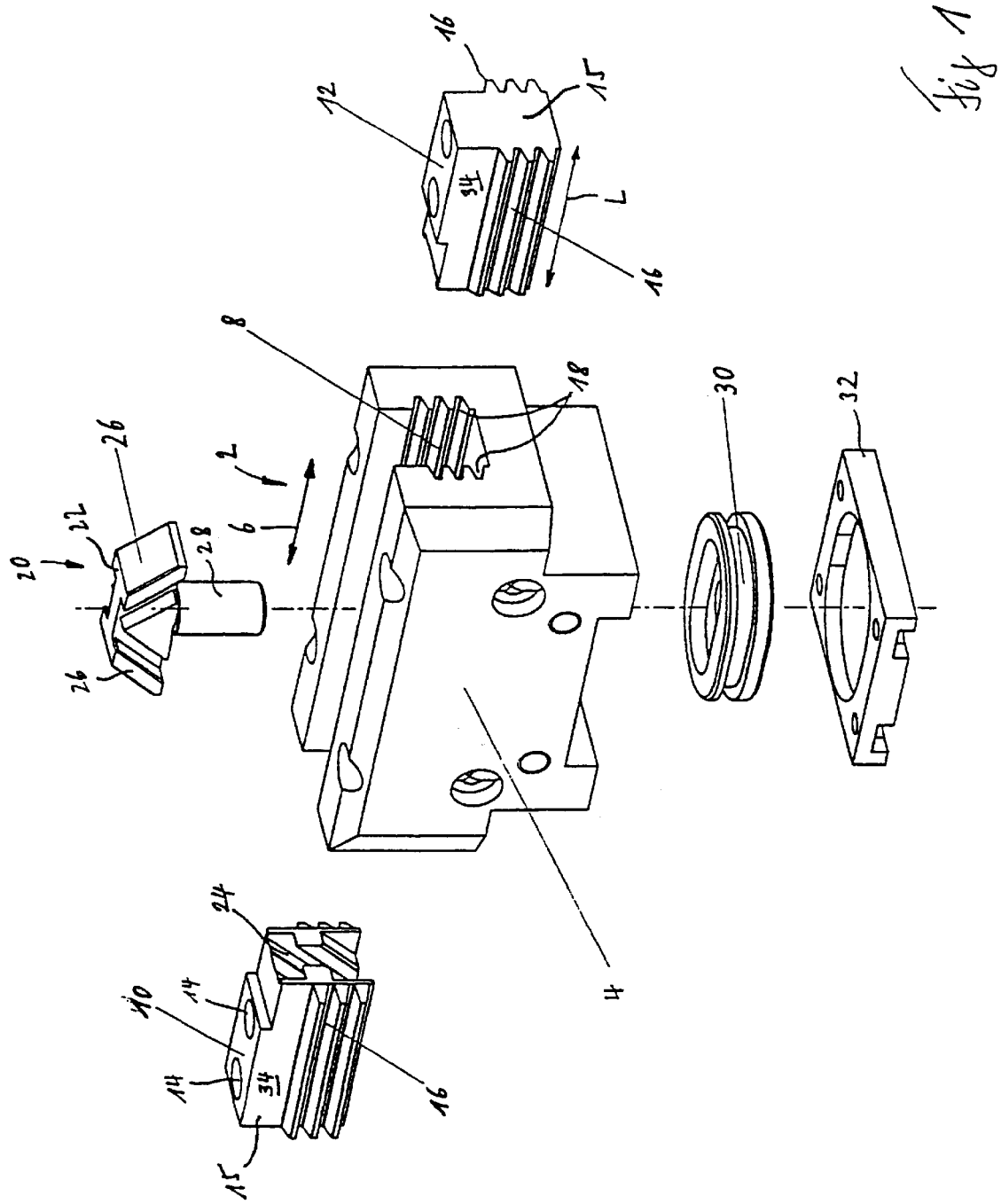
FIG. 1 shows an exploded perspective view of the main components of the parallel gripper under the invention.

FIG. 1 shows a parallel gripper identified overall with the reference numeral 2. It comprises a gripper housing 4 having a jaw guide opening 8 extending in a longitudinal direction 6 for base jaws 10 and 12 which are shown outside the housing and which can be introduced into the jaw guide opening 8 in longitudinal direction 6 and are slidable therein. On an upper side of the base jaws 10 and, 12, mounting holes 14 are provided for the detachable mounting of gripper finger elements in the broadest sense, which will not be discussed in greater detail here.

Each of the base jaws 10, 12 has guide ribs 16 on both sides extending in the longitudinal direction and therefore in the direction of adjustment, which are wedge-shaped or trapezoid-shaped with a flattened end. On each base jaw 10, 12, three guide ribs 16 are provided, projecting on both sides of the body 15 of the base jaws, arranged one above the another and extending over the entire length L of the base jaw.

The jaw guide opening 8 in the gripper body 4 has complementary wedge-shaped or trapezoid-shaped guide grooves 18, which the guide ribs 16 engage and slide therein in a longitudinal direction 6, whereby the guide ribs 16 engage the guide grooves 18 essentially without backlash, so that they do not undergo any positional inaccuracy when absorbing forces or rotational moments, but can transmit the forces and moments to the gripper body 4 or to the gripper fingers without rotating.

A wedge hook mechanism identified overall with the reference numeral 20 is provided to adjust the position of the gripper base jaws 10, 12, it comprises a wedge hook 22 whose upper part has slide sections 26 which can be introduced into obliquely running recesses 24 in the base jaws 10, 12. The wedge hook 22 further possesses a lower rod section 28 with which it passes through an opening not shown in the bottom of the jaw guide opening 8 and engages a cylinder located therebelow in the gripper housing 4. A piston 30 is guided moveably in this cylinder, and the cylinder is closed by a base plate 32. The rod section 28 of the wedge clamp 22 is connected to the piston 30. The cylinder with the piston 30 forms a hydraulic or pneumatic actuating device. With the upward movement of the piston 30 and thereby of the wedge hook 22, the slide sections 26 slide in the corresponding oblique recesses 24 and thereby move the base jaws 10, 12 away from each other. With the downward movement of the wedge hook 22, the base jaws 10, 12 are moved toward each other.

Figure 2:
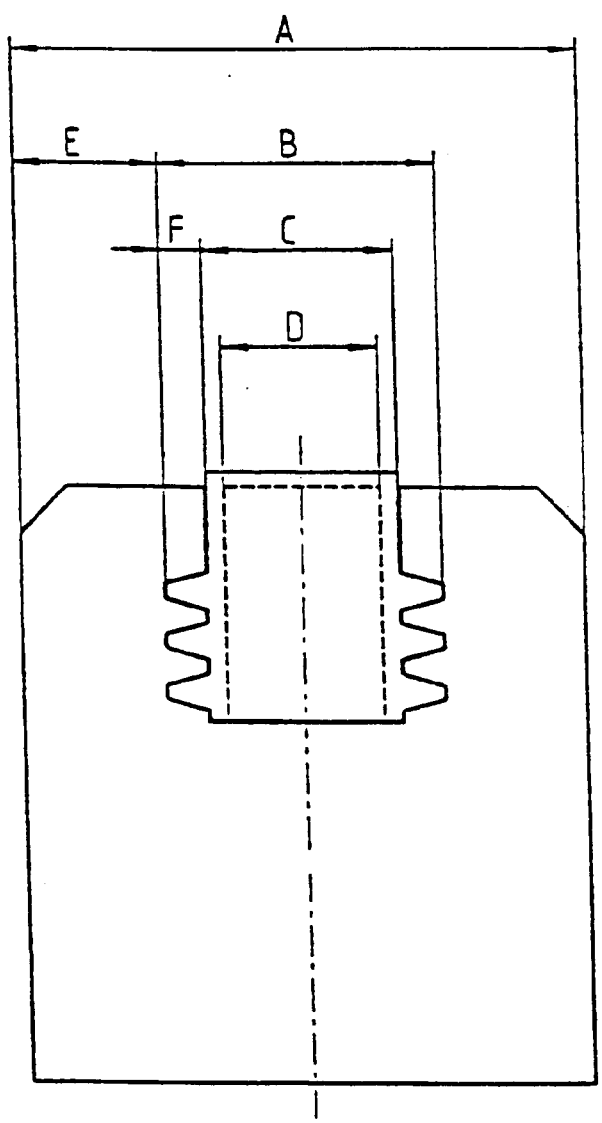
FIG. 2 shows a simplified end view of the parallel gripper from FIG. 1 to illustrate the dimensions.

Because of the plurality of guide ribs 16, a large guide width is prepared on each side for the absorption and transmission of forces and moments. FIG. 2 shows the guide width F of the guide ribs 16. By this is meant the height of the guide ribs 16 above the width of the body 15 of the base jaws 10, 12, thus their extension beyond the lateral surface 34 of the base jaws 10, 12. Through the three guide ribs 16 provided in each instance, the total available guide width on each side is three times F, whereby the overall external width B of the base jaws is only one times F greater on both sides than the base width C of the base body 15 of the base jaws. In turn this means that with a specified external width B, the base width C can be selected relatively large, which in turn means that the respective width D of the wedge hook 22, or of the slide section 26 of the wedge hook 22, can be selected very large compared with the external width B of the base jaws.

With a given external width B and a similarly given housing width A, the wall thickness E can similarly be dimensioned relatively large, with a resulting high degree of precision, since the gripper housing remains distortion-free even at the high forces transmitted by the oval piston 30 and the large angular power transmission width D of the wedge hook 22.

In accordance with an especially preferred aspect of the parallel gripper of the invention, the dimensions in three sizes are given below according to the following table.

| Size | Housing width A | Jaw width B | Rail width C | Wedge hook width D | Wall thickness E | Guide width F |
|---|---|---|---|---|---|---|
| Size 1 | 36 | 17.5 | 12 | 9.5 | 9.25 | 2.75 |
| Size 2 | 50 | 25.5 | 18 | 14 | 12.75 | 3.75 |
| Size 3 | 72 | 37 | 26 | 21 | 17.5 | 5.5 |

What is claimed is:

1. A parallel gripper having a housing and two adjustable gripper base jaws which are slidably guided in the housing in a jaw guide opening, where the base jaws can be moved toward or away from each other by means of a wedge hook mechanism and the wedge hook mechanism is adjustable by means of a piston which is mounted in the housing, characterized in that the piston has an essentially rectangularly configured shape with rounded corners;

each base jaw has at least two guide ribs on both sides, at least one of rectangular, wedge-shape and trapezoidal in cross section and extending in the sliding direction, and the jaw guide opening has guide grooves configured complementary thereto;

a ratio of the wall thickness of the housing measured between a root of the guide grooves and an outside of the housing to a width of the housing measured perpendicular to the sliding direction of the base jaws is at least about 0.2; and a ratio of the an angular power transmission width of the wedge hook mechanism to an external width of the base jaws is at least about 0.4.

2. The parallel gripper of claim 1, wherein the wedge hook mechanism has a wedge hook adjustable by means of the piston, the wedge hook engaging in recesses running obliquely in the two base jaws.

3. The parallel gripper of claim 2, wherein the wedge hook of the wedge hook mechanism extends through an opening in the housing in a bottom of the jaw guide opening and is drivably connected to the piston.

4. The parallel gripper of claim 1, wherein the guide ribs extend over an entire length of the base jaws.

5. The parallel gripper of claim 1, wherein a ratio of the height of the guide ribs to a width of a base body of the base jaws is between 0.15 and 0.25.

6. The parallel gripper of claim 1, wherein an angle of at least one flank of the guide ribs is between 12° and 20° to the normal direction of the guide ribs onto a lateral surface of a base body of the base jaws.

7. The parallel gripper of claim 1, wherein the ratio of the diameter of the piston to the housing, measured perpendicular to the sliding direction of the main jaws is between 1.2 and 1.6.

8. The parallel gripper of claim 1, wherein the ratio of the height of the guide ribs to the width of a base body of the base jaws is between 0.19 and 0.24.

* * * * *